US004001781B2

United States Statutory Invention Registration [19]

[11] Reg. Number: H1781

Mandel et al. [45] Published: Feb. 2, 1999

[54] AUTOMATICALLY RETRACTABLE EXTENDING NIP SHEET EJECTION SYSTEM FOR A MULTIPLE OUTPUT LOCATIONS STACKING DEVICE

[75] Inventors: Barry P. Mandel, Fairport; Richard P. Ficarra, Ontario; Frederick A. Green, Fairport; Richard A. Van Dongen, Newark; Don S. Walker, Rochester, all of N.Y.

[73] Assignee: Xerox Corporation, Stamford, Conn.

[21] Appl. No.: 826,175

[22] Filed: Mar. 27, 1997

[51] Int. Cl.[6] ..... B65H 39/05

[52] U.S. Cl. ..... 270/58.23

[58] Field of Search ..... 270/58.11, 58.09, 270/58.13, 58.28, 52.05, 52.02; 271/292, 294, 296, 303

[56] References Cited

U.S. PATENT DOCUMENTS

| | | | |
|---|---|---|---|
| 5,342,034 | 8/1994 | Mandel et al. | 270/53 |
| 5,382,012 | 1/1995 | Mandel et al. | 270/53 |
| 5,513,839 | 5/1996 | Green | 270/53 |
| 5,603,492 | 2/1997 | Mandel et al. | 270/58.09 |

OTHER PUBLICATIONS

Allowed Application No. 08/566,199 (D/95206), filed Dec. 1, 1995, by Mandel, et al; Title: Automatic Sheet Stacking Edge Registration Members Repositioning System With Transverse Tamper Positioning.

Xerox Disclosure Journal, vol. 6, No. 5, Sep./Oct., 1981, pp. 237, 238, by Gerhard S. Kobus, Title: Variable Sheet Deflector For Document Restacking.

*Primary Examiner*—Charles T. Jordan
*Assistant Examiner*—Meena Chelliah

[57] ABSTRACT

In a sheet handling system with an array of multiple individual sheet stacking bins and a sheet feeding system for feeding sheets from a sheet feeding output nip thereof into selected bins, for stacking of the sheets into the selected the bins, with relative movement between the sheet feeding system and the multiple individual sheet stacking bins; an automatic nip extending system is provided for automatically moving the sheet feeding output nip out into an individual bin for improved sheet control for the feeding of sheets into the bin, and an automatic nip retracting system for automatically moving the sheet feeding output nip out of the bins for unobstructed relative movement between the sheet feeding system and the sheet stacking bins, in coordination with the relative movement between the sheet feeding system and the multiple individual sheet stacking bins. The nip extending system preferably includes a repositionable extended loop sheet feeding belt.

7 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTROLLER

104
DISPLAY
100
10
11a
11
102
18
11b
26
17
14
25
23
22
13
18
21
25
26
17
16

AUTOMATICALLY RETRACTABLE EXTENDING NIP SHEET EJECTION SYSTEM FOR A MULTIPLE OUTPUT LOCATIONS STACKING DEVICE

The present system provides improved reliability in sheet output eeding for the stacking of sheets into selectable multiple output stacking ocations, such as the feeding of various printed sheets into selected ones of he multiple bins or mailboxes of a sorter, collator, or printer mailboxing unit.

In particular, there is disclosed herein a simple and low cost nip extension system for extending the sheet feeding control over sheets as the sheets are fed into a selected bin, tray or mailbox (these terms may be used interchangeably here) of a multi-bin stacking unit. The disclosed extending nip system is also, importantly, automatically retracted from any bins as the sheet or sheet set feeding system providing that extended eject nip moves between bins, or vice versa (i.e., as the bins move relative to the sheet or sheets exit position output nip). (As to the latter, it is noted that moving bins systems are generally more suitable for sorters than for mailbox systems, for which fixed bins and moving sheet ejection systems are generally preferable.)

In either case, the feeding control of the sheets as they are being ejected into the stacking bins, trays or mailboxes presents long-standing known problems, for which many different solutions have been attempted or proposed. The numerous problems in sheet ejection into stacking bins which various sheet feeding systems have attempted to overcome or fix include problems of "hang-ups" or "fold-overs" of the sheet being ejected, curled sheets in the input to the bin, excessive sheet ejection velocity or "overshoot" in the tray or bin, skewing of the sheets in the stacked set in the bin by releasing the sheet in the wrong position or height, excessive "flotation" of the sheet as it is released and allowed to settle by gravity onto the stack, etc. The extensive discussions of these and other sheet stacking and restacking problems in the patent and other literature are known to those skilled in the art and need not be reiterated here.

Of particular interest here is the problem of "trail edge hang-up" in feeding sheets into stacking bins over a vertically extending stacking registration wall, especially with the non-moving (fixed) bins of a printer mailbox system. The trailing end of some sheets may not feed out fully into the bin, and thus come to rest "hung up" on top of that registration wall of the bin instead of settling down fully inside the bin. The hung-up sheet is mis-stacked, and it can also obstruct the path of the next sheet being fed into that bin. The hung up sheet can also or alternatively be pushed up and out by that next sheet feeding in thereunder, so as to fold over in the bin and create a misfeeding or jam condition, or change the sheet order and thus produce an uncollated set in the bin.

Another potential sheet stacking ejection problem is that an incoming sheet with a downward lead edge curl, and/or inadequate beam strength or thickness (especially thin, flimsy paper sheets) can hit or catch on the front or upstream stacking registration wall provided in the stacking tray or bin to cause a misfeeding jam.

Typically, a stacking tray or bin has an upwardly sloping tray bottom surface so that as the sheets are ejected therein they are slowed down by gravity and then reversed in direction to slide back down against an upstream registration wall for stacking alignment and deskewing there. However, as discussed above, that desired upstream registration wall presents an obstruction over which all the incoming sheets must be fed. (If the stacking were downhill instead, by providing a downhill sloping tray bottom, then the stacking may be against a downstream registration edge, but that is not typical of most sorters, collators or mailbox systems, for various reasons known to those in the art, especially if stapling is desired.)

For these and other reasons, it is desirable to more positively control the sheet feeding into the stacking tray or bin by maintaining a sheet feeding nip control over the sheet as far out into the stacking tray as possible prior to the release of the sheet for stacking. However, heretofore this has not been practicable in a sorter, collator or mailbox system where sheets or sets of sheets must be directed into respective different trays, bins, or mailboxes. That is because the sheet feeding ejection system and its ejection nip must move relative to the trays, bins, or mailboxes. That is, either the exit nip must move past an array of stationary bins, or the bins must be sequentially movable past a stationary or fixed exit nip. If the exit nip were extending out into these trays, bins or mailboxes over the upstream or inside registration wall thereof, this necessary relative movement would not be possible. The extended nip would be broken off or would prevent this necessary movement of the exit nip from one bin to another.

The present system overcomes the above and other difficulties by allowing this relative movement yet also providing an extended sheet exit nip extending out into the bin. As shown in the disclosed embodiments, this can be provided automatically by an automatic extension and retraction of the extended sheet feeding nip into the stacking bin in use, with automatic retraction of the extended nip from the bin in coordination with the relative movement between the exit nip and the multiple bins to allow that movement to be unobstructed.

Although not limited thereto, in the disclosed embodiment there is also disclosed one system of automatically pivoting the extended exit nip out or in of the bins by a plural mode function of the automatic tamper system of a moving collator unit. However, it will be appreciated that various other automatic ivoting systems could be provided, such as by engagement of various cams or isengagement systems of various other types operative during the relative movement between the exit nip and the bins. Likewise, the exit nip can be automatically extended into the bin by various spring or gravity pivoting or other movement systems other than those disclosed in the embodiment herein. Furthermore, the specific extended nip system here is merely exemplary and various extending baffles, roller, and/or belt systems which effectively extend the feeding nip and control over the sheet into the bin may be employed.

Prior proposed or provided solutions for improving sheet control during sheet ejection into stacking trays in general include providing corrugations of the sheet by exit feed rolls or belts and/or various movable and/or flexible baffles or guides, such as those shown in the *Xerox Disclosure Journal* publication Vol. 6, No. 5, dated September/October, 1981, page 237–238.

By way of background as to movable tampers and/or plural function tamper drive systems and sheet feeding ejection systems for mailbox bins there is disclosed Xerox Corporation allowed application Ser. No. 08/566,199 filed Dec. 1, 1995 by the some Barry P. Mandel and others, Attorney Docket No. D/95206, to become U.S. Pat. No. 5,639,078; and U.S. Pat. No. 5,513,839 issued May 7, 1996 to Frederick A. Green entitled "Dual Mode Sheet Stacking Tamper and Sheet Feeder Offset System" (D/94126). These patents may be referred to in connection with the following embodiment description for further details of exemplary plural mode tamper systems and exemplary mailbox systems.

Although the present system can also be applicable to various sorters (otherwise known as collators) and the like, the specific embodiment herein is a printer "mailbox" system. By way of background and further details of mailbox systems and their particular features and difficulties, there is noted the extensive discussion thereof, and the citation of other references thereon, in Xerox Corporation U.S. Pat. No. 5,342,034 issued Aug. 30, 1994 to the same Barry P. Mandel and Richard A. VanDongen; and also U.S. Pat. No. 5,382,012 issued Jan. 17, 1995 to Mandel et al. Note, e.g., that FIG. 1 of said U.S. Pat. No. 5,382,012 is similar to FIG. 1 herein with the exception of the novel additional embodiment features disclosed herein. Similar disclosures are in other Xerox Corporation mailbox systems patents.

Of particular interest, as to mailbox systems with retractable stacking assistance members, is the automatically pivotable set height measurement finger system which is automatically inserted into and retracted from the mailbox bins of U.S. Pat. No. 5,603,492 issued Feb. 18, 1997 to the same Barry P. Mandel and others.

As explained in these mailboxing systems patents, by way of background a mailboxing system is normally for separating plural page collated print jobs by users or clients into respective bins for the respective users, not for the collation of a print job by separating identical individual pages into different bins. Thus, in a mailboxing system, unlike a sorter or collator, the number of sheets placed in any one mailbox bin of the array of bins or mailboxes at any one time may vary greatly. Plural precollated sets of stapled or unstapled sheets may be placed in individual bins at one time. Also, the mailbox bins are not normally filled sequentially. This is in contrast to a sorter or collator system for post-collation of the plural pages of plural sets of a print job, normally by placing one identical copy sheet of each page of the job set sequentially in each bin one at a time until one identical job set is collated in each bin.

Another difference is that with moving bins sorters or collators, the bin spacing can be temporarily increased for the bin into which the sheets are being inserted, as is well known. However, mailbox bins are preferably fixed, and thus cannot. Yet, mailbox bins must be relatively closely superposed to provide enough bins for the various users or clients. That is, for a mailbox system which is relatively compact, yet still provides a sufficient number of mailboxes for a sufficient number of different shared users, the sheet capacity or sheet stacking height of each mailbox bin must be relatively limited, and the spacing between each mailbox bin must be relatively limited. This provides a practical restriction on the amount of space available between bins for the ejection of the sheets or sets of sheets into a respective bin, thus imposing further criticality on better control of the sheet ejection path into the bin to avoid misfeeding or jams.

A specific feature of the specific embodiment(s) disclosed herein is to provide a sheet handling system with an array of multiple individual sheet stacking bins and a sheet feeding system for feeding sheets from a sheet feeding output nip thereof selectively into selected said bins, for stacking of the sheets into the selected said bins, with relative movement between said sheet feeding system and said multiple individual sheet stacking bins comprising an automatic nip extending system for automatically moving said sheet feeding output nip of said sheet feeding system out into an individual said bin for improved sheet control for said feeding of sheets from said sheet feeding output nip into said individual bin; and an automatic nip retracting system for automatically moving said sheet feeding output nip of said sheet feeding system out of said bins for unobstructed said relative movement between said sheet feeding system and said multiple individual sheet stacking bins.

Further specific features disclosed herein, individually or in combination, include those wherein said automatic nip retracting system automatically retracts said sheet feeding output nip out of said bins in coordination with said relative movement between said sheet feeding system and said multiple individual sheet stacking bins to allow that movement to be unobstructed; and/or wherein said automatic nip extending system includes a repositionable extended loop sheet feeding belt; and/or wherein said automatic nip extending system includes a repositionable extended loop sheet feeding belt mounted at its outer end to a pivotally mounted belt pulley; and/or wherein said sheet feeding system includes a sheet tamper system, and said automatic nip retracting system is operated by said sheet tamper system; and/or wherein said automatic nip extending system includes a repositionable extended loop sheet feeding belt mounted at its outer end to a pivotally mounted belt pulley and a movable idler roller moveable into and out of sheet feeding engagement with said extended loop sheet feeding belt at said outer end to form an extended sheet feeding nip therebetween in said engagement; and/or wherein said automatic nip extending system includes a repositionable extended loop sheet feeding belt mounted at said outer end to a pivotally mounted belt pulley and a baffle plate spring loaded into sheet feeding engagement with said extended loop sheet feeding belt at said outer end thereof to form an extended sheet feeding nip therebetween.

In general, in various reproduction apparatus such as xerographic and other copiers and printers or multifunction machines, it has become increasingly important to provide faster yet more reliable and more automatic and positive handling of the physical image bearing sheets, with better sheet control and reduced misfeeding, jam, and sheet damage rates. It is desirable to reliably feed and accurately register and stack sheets of a variety and/or mixture of sizes, types, weights, materials, humidity and other conditions, and susceptibility to damage. Sheets can vary considerably even if they are all of the same "standard" size, (e.g. letter size, legal size, A-4, B-4, etc.). They may have come from different paper batches or have variably changed size with different age or humidity conditions, different imaging, fusing, etc..

The disclosed system may be operated and controlled by appropriate operation of conventional control systems. It is well known and preferable to program and execute printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, of course, the control system or method may be implemented partially or fully in hardware, using standard logic circuits or single chip VLSI designs.

It is well known that the control of sheet handling systems may be accomplished by conventionally actuating them with signals from a microprocessor controller directly or indirectly in response to simple programmed commands, and/or from selected actuation or non-actuation of conventional switch inputs. The resultant controller signals may conventionally actuate various conventional electrical solenoid or cam-controlled sheet deflector fingers, motors or clutches, or other components, in programmed steps or sequences. Conventional sheet path sensors or switches connected to the controller may be utilized for sensing, counting, and timing the positions of sheets in the sheet paths, and thereby also controlling the operation of sheet feeders, etc., as is well known in the art.

In the description herein the term "sheet" or "copy" refers to a usually flimsy physical sheet of paper, plastic, or other suitable physical substrate for images, whether precut or initially web fed. A "job" is normally a set of related sheets, usually a collated copy set copied from a set of original document sheets or electronic document page images, from a particular user, or otherwise related.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, all of which are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation shown and described in the examples below, and from the abstract and claims. Thus, the present invention will be better understood from this description of specific embodiments, including the drawing figures (approximately to scale) wherein:

Figure 1:
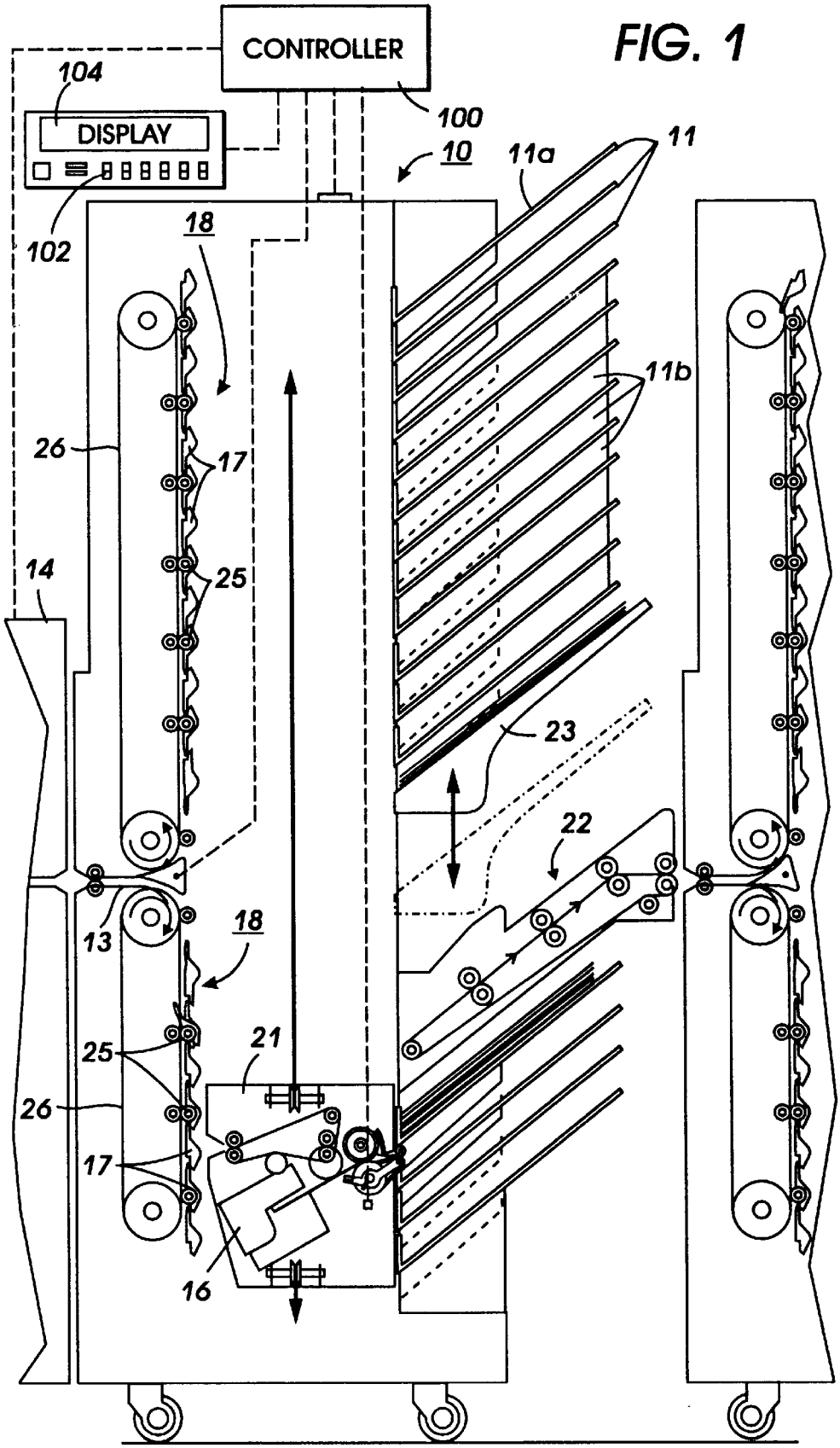
FIG. 1 is a partially schematic frontal view of an exemplary mailbox system as one example of the possible application of an exemplary sheet output nip automatic extension and retraction system which may be provided in accordance with the invention.
Figure 2:
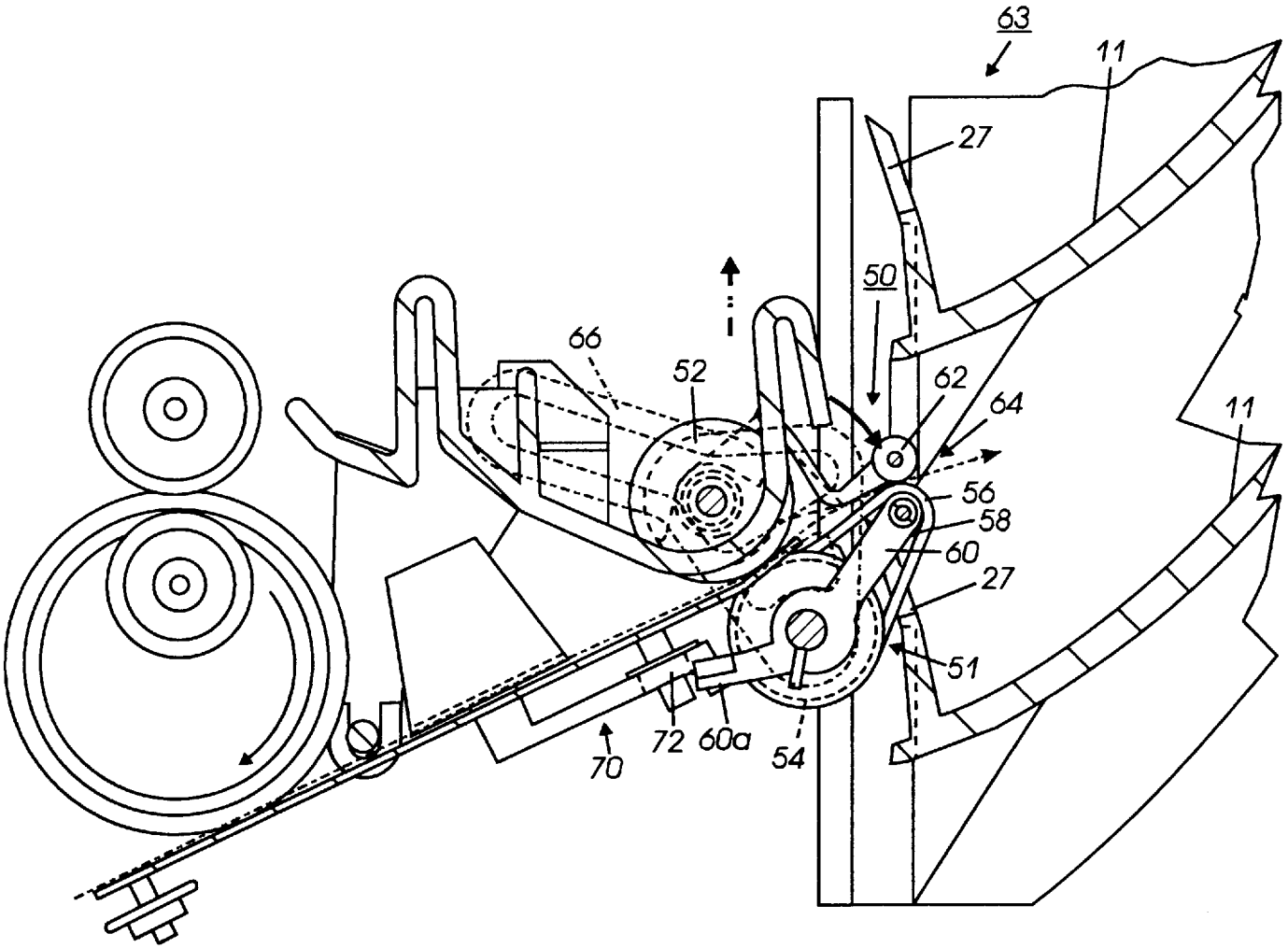
FIG. 2 is a enlarged partial view of just the exemplary retractable and extendable nip system of FIG. 1, shown in its extending nip sheet ejecting position, with a sheet ejection as indicated by the dashed line with an arrowhead thereon extending into the sheet stacking bin or mailbox.
Figure 3:
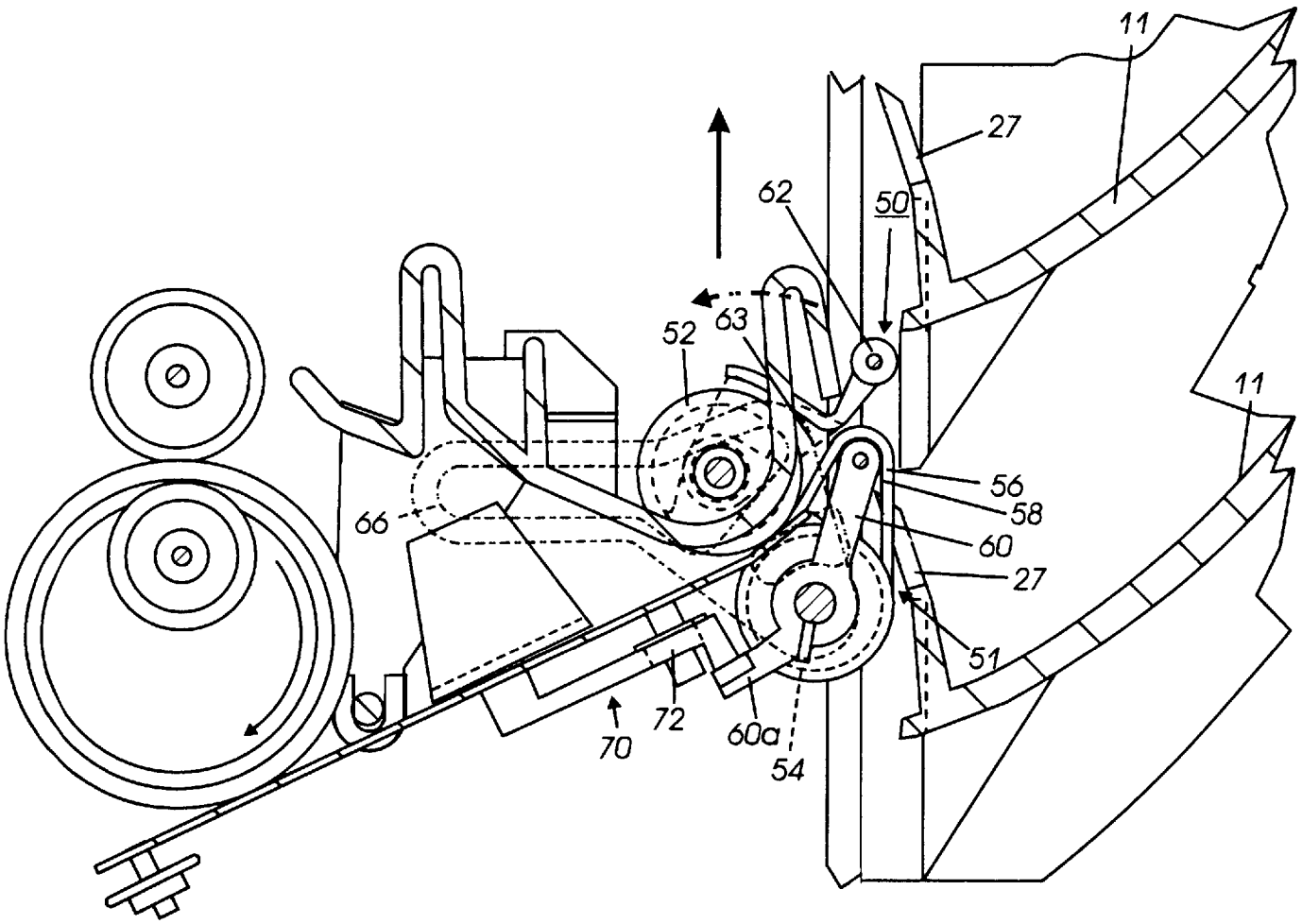
FIG. 3 shows in the same view as FIG. 2 the position of the system wherein the extended nip has been automatically retracted, so as not to extend into the bins, for unobstructed movement to another bin.
Figure 4:
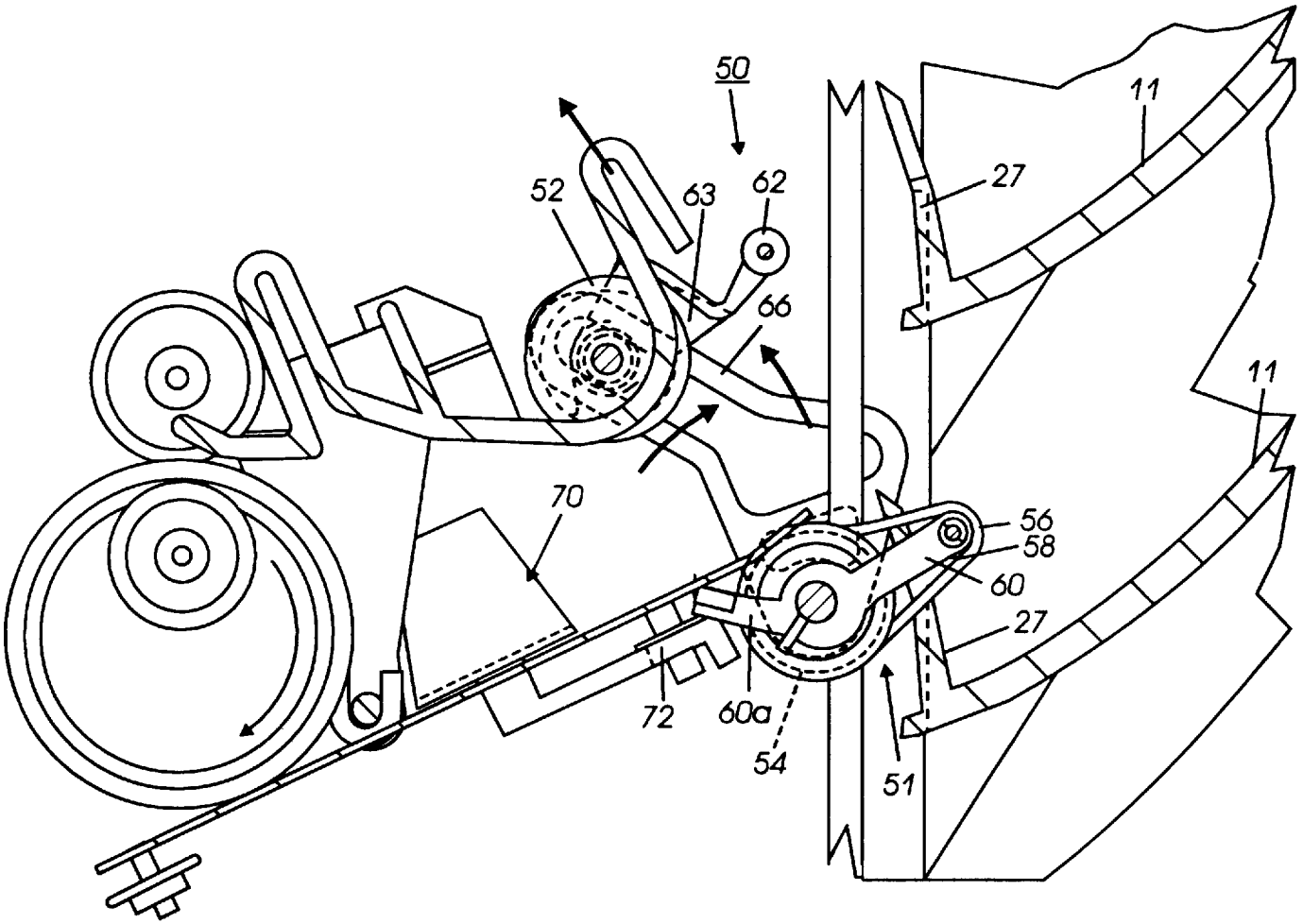
FIG. 4 is an alternative operating mode and system position for the same system shown in FIGS. 2 and 3, wherein the downstream nip forming unit is extended into the bin but the nip is automatically opened by lifting of its mating idler to allow for extending sheet edge compiling therebetween.
Figure 5:
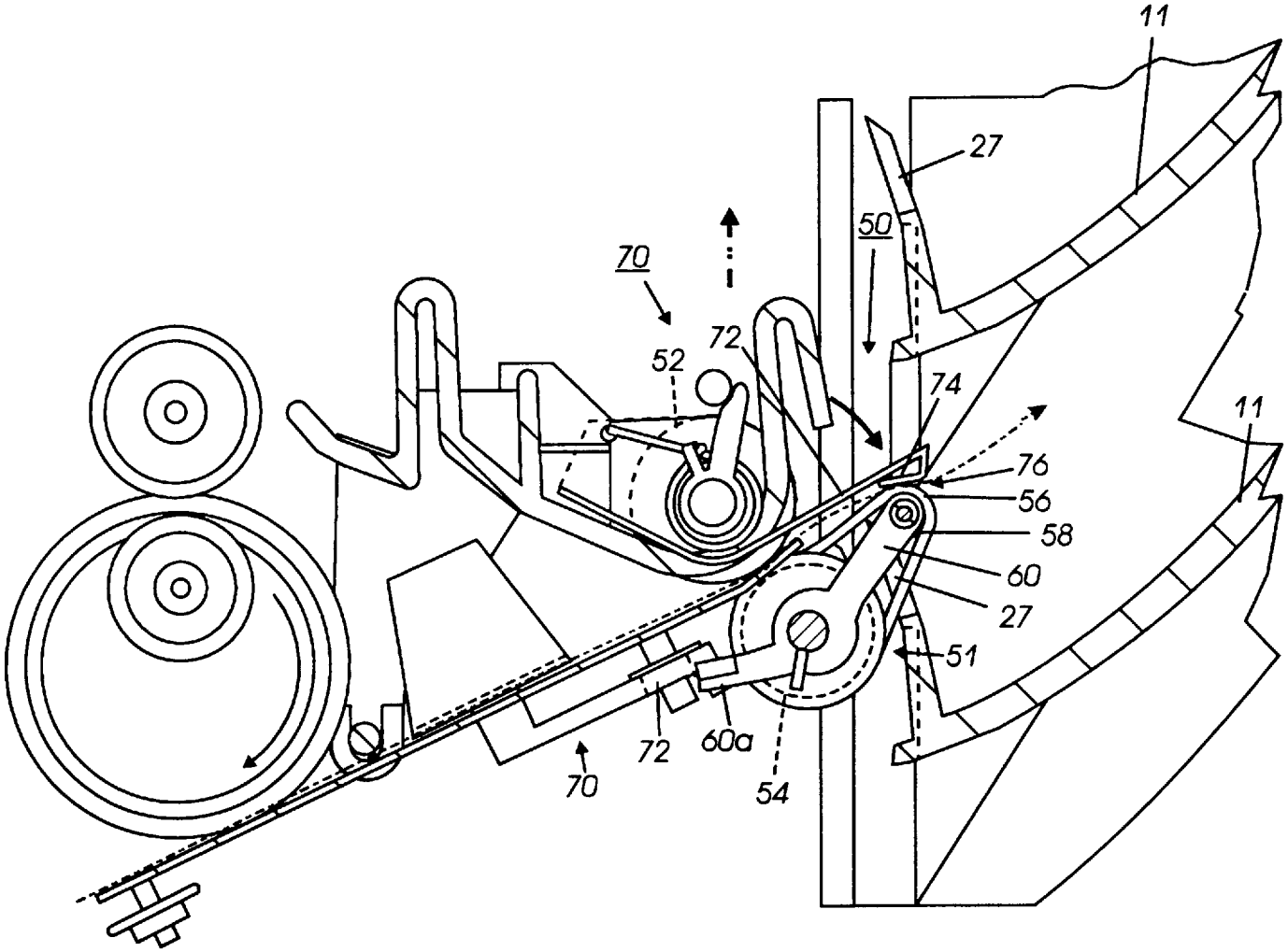
Figure 6:
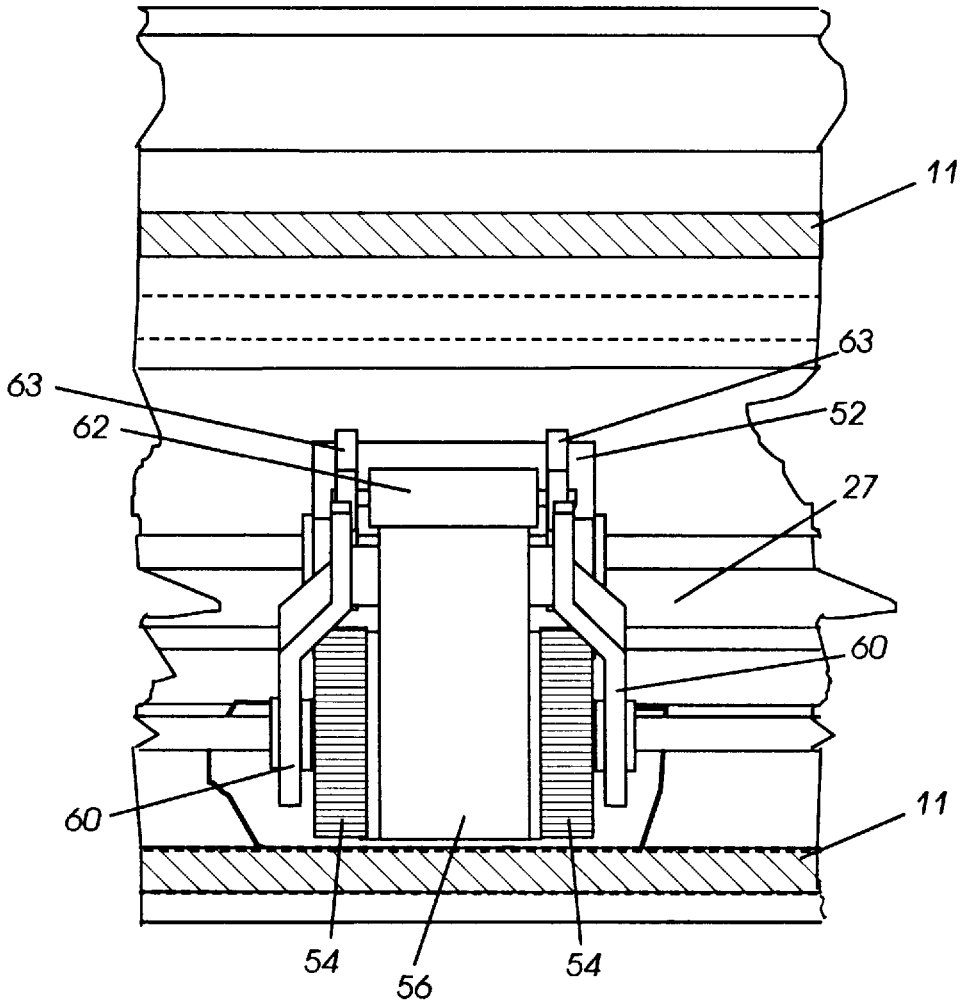

FIG. 5 is an alternative, but otherwise similar, embodiment of the system of FIGS. 1–4 with a spring loaded sheet corrugating baffle plate forming the nip with the driven extended nip forming unit's belt and pulleys system, rather than forming the nip with an engaging idler roller as illustrated in FIGS. 2–4; and FIG. 6 is a partial end view of the system and operating position of FIG. 2, i.e., facing the extended nip.

As noted above, while the embodiments of the Figures are for a mailboxing system with a moving compiler/finishing system moving vertically between selected fixed mailbox bins, and while the pivotal movement of the extending nip into its retracted position is accomplished here by a repositioning of the side tamper system thereof, as will be further described below, this is merely exemplary of the various versions, alternatives and applications of the present invention, which will vary depending upon the particular sorter, collator, or mailboxing system and its sheet output system and the relative movement system being provided.

Referring to FIG. 1, there is shown one example of a prior art mailboxing system 10, further described in the above-cited references, as noted. In the mailbox unit 10 of FIG. 1 a vertically repositionable compiler and finishing unit 21 is movable vertically adjacent to selected bins 11 of a vertical array of bins. Some or all of the bins 11 may be locked, electronically unlockable, bins 11*b*, or an open top or general tray 11*a*, a high capacity elevator stacking tray 23, or a bypass transport 22 to another downstream unit 10. This may all be under the control of a programmable controller 100 with an associated display 104 and keypad entry system 102. This mailbox unit 10 is sequentially fed individual printed sheets from an operatively connected printer 14 to an input path 13 on to a belt transport system 26 similar to that in use in many sorters or collators, with belt engaging rollers 25 and pivotal gates 17 providing a variable position gating system 18 for selectably gating sheets into the compiling and finishing unit 21 at different vertical positions thereof. It will be appreciated that the unit 10 could alternatively be utilized for or operated as a sorter or collator by feeding individual sheets sequentially from sequential pivoted gate 17 into and through the unit 21 directly out into a selected bin 11 one sheet per bin and moving the unit 21 after each sheet has been fed into that bin. However, as described in the above-cited mailbox references, that is not the normal or desired function of this mailbox unit 10, which is normally to either sequentially feed all of the sheets of a job set into one or more bins 11 designated or assigned to a particular user or group of users. If the sheets are not to be stapled or otherwise bound in the unit 21 they may be directly fed therethrough sequentially into a bin to be stacked therein. In this exemplary system, if the sheets are to be compiled and stapled first, as by the stapler 16, the sheets are fed into the unit 21 and compiled and stapled therein an then the set is ejected into the bin, as described in the above-cited references. However, as also described therein, it is desirable for space saving for the sheets being compiled for finishing in the unit 21 to be able to partially extend out into the tray 11 into which they will be subsequently ejected after stapling. This is provided by opening the exit nip, as shown for example in FIG. 4, as will be further described.

This feeding of sheets sequentially thorough the unit 21 to eject for stacking with improved control may be provided as shown in the embodiment of FIG. 2 or the embodiment of FIG. 5 by providing a closed feeding nip 64 to be described, which nip, in the present system, desirably extends out downstream into the tray 11 during that operation, extending over the bin's upstream registration edge wall 27. This provides substantially improved sheet feeding and sheet ejection control, with greatly reduced opportunities for sheet "hang-ups" or obstruction in such feeding, even for curled sheets.

Referring now to the exemplary sheet ejection extendible nip system 50 of FIGS. 2–4, incorporated in this example into the mailbox system of FIG. 1, there is provided in this exemplary system 50 two transversely spaced apart pivotally extendible eject transport units 51, each unit 51 comprising a pivotally mounted elongated belt 56, which belt 56 is mounted between an inner or upstream flanged idler roller and pulley 54 and an outer or downstream pulley 58, on a pivotable arm 60. Although the unit 51 could be driven directly, here it is driven indirectly, by the engagement of flanged pulley 54 by a driven elastomeric roller 52. Roller 52 also provides, with roller 54, an upstream sheet feeding nip drive here. That is, when roller 52 is lowered, as in FIGS. 2 and 3 but not 4 (reference the above-cited patent descriptions), roller 52 engages a sheet between it and idler pulley 54. The edge flanges on pulley 54 can also provide some sheet corrugation feeding assistance in that nip. This plastic idler pulley 54 here is thus both mounting and driving the inside end or bight of the elongated frictional feeding belt 56. With the exception of the extendible arm 60 mounting the outer idler pulley 58, and the portion of the belt 56 extending therearound, these components are all mounted upstream of the bins 11, so as not to have any interference movement relative to the array of bins.

As noted, the extending outer end mounting of the feed belt 56 is an outer pulley 58 mounted on the outer end of a pivotal arm 60. The arm 60 can be mounted to pivot about the same axis as the rollers 54, as here. Here, an inner end portion 60*a* of this pivotal arm 60 is positioned to be engaged by, and cammed upwardly or clockwise by an extension 72 of the lateral sheet tamping system 70 in the compiler unit 21 when the tampers are moved out laterally beyond their normal tamping position (as more fully described in detail in the above cited references thereon). That pivots down and outwardly the unit 51 to extend the outer idler pulley 58 and thus the outer end of belt 56 out into the adjacent bin 11.

In this system 50, the extending belt loop of belt 56 of the unit 51 is positioned to be engaged at its outer end, at the outer pulley 58, by an idler roller 62 to form an extended nip 64. The idler roller 62 is pivotable on a mounting arm 63 into that nip forming engagement as shown by the movement arrow in FIG. 2, and is pivotable out of engagement with the outer end of the belt 56 as shown by the movement arrows in FIGS. 3 and 4. Here, this movement is independent, so that as shown in FIG. 4, for compiling sets of plural sheets in the compiler unit 21, the roller 62 is pivoted up but the extended feed belt unit 51 remains down extending out into the bin, to held support the outer ends of sheets being compiled, and providing a large, unobstructed, opening between roller 62 and belt unit 51.

It may be seen from FIG. 3 that the outer end pulley 58 which is extending the sheet feed belt loop 56 out downstream to form the downstream eject nip position 64, automatically pivots out of the way for unobstructed vertical movement of the compiler/finisher carriage unit 21, as does the roller 62. Here, this is accomplished by pivoting of a "U" shaped bracket 66 which pivots counterclockwise the mounting arm 63 on which the idler 62 is mounted, as well as the arm 60 on which the extended feeding belt unit 51 is mounted, as shown by the difference in positions of these components between FIG. 2 and FIG. 3 and the movement arrows in FIG. 3.

The extended nip system embodiment 70 of FIG. 5 may be otherwise similar to that of FIGS. 2–4. However, there is an illustrated difference in the replacement of the idler roller 62 and its arm 63 with a spring loaded baffle plate 72. This baffle 72 may also have "wing" tabs 74 to corrugate the sheet as it is fed through the downstream extended nip 76.

It will be obvious that there are numerous other mechanisms which can be used to achieve the above-described movements and functions. While the embodiments disclosed herein are generally preferred, it will be appreciated from this teaching that various alternatives, modifications, variations or improvements therein may be made by those skilled in the art, which are intended to be encompassed by the following claims:

We claim:

1. In a sheet handling system with an array of multiple individual sheet stacking bins and a sheet feeding system for feeding sheets from a sheet feeding output nip thereof selectively into selected said bins, for stacking of the sheets into the selected said bins, with relative movement between said sheet feeding system and said multiple individual sheet stacking bins, the improvement comprising:

an automatic nip extending system for automatically moving said sheet feeding output nip of said sheet feeding system out into an individual said bin for improved sheet control for said feeding of sheets from said sheet feeding output nip into said individual bin, and an automatic nip retracting system for automatically moving said sheet feeding output nip of said sheet feeding system out of said bins for unobstructed said relative movement between said sheet feeding system and said multiple individual sheet stacking bins.

2. The sheet handling system of claim 1, wherein said automatic nip retracting system automatically retracts said sheet feeding output nip out of said bins in coordination with said relative movement between said sheet feeding system and said multiple individual sheet stacking bins to allow that movement to be unobstructed.

3. The sheet handling system of claim 1, wherein said automatic nip extending system includes a repositionable extended loop sheet feeding belt.

4. The sheet handling system of claim 1, wherein said automatic nip extending system includes a repositionable extended loop sheet feeding belt mounted at its outer end to a pivotally mounted belt pulley.

5. The sheet handling system of claim 1, wherein said sheet feeding system includes a sheet tamper system, and said automatic nip retracting system is operated by said sheet tamper system.

6. The sheet handling system of claim 1, wherein said automatic nip extending system includes a repositionable extended loop sheet feeding belt mounted at its outer end to a pivotally mounted belt pulley and a movable idler roller moveable into and out of sheet feeding engagement with said extended loop sheet feeding belt at said outer end to form an extended sheet feeding nip therebetween in said engagement.

7. The sheet handling system of claim 1, wherein said automatic nip extending system includes a repositionable extended loop sheet feeding belt mounted at said outer end to a pivotally mounted belt pulley and a baffle plate spring loaded into sheet feeding engagement with said extended loop sheet feeding belt at said outer end thereof to form an extended sheet feeding nip therebetween.

* * * * *